March 21, 1961 F. H. BENTHAM 2,975,504
RASPING APPLIANCES AND CUTTERS
Filed July 11, 1958 2 Sheets-Sheet 1
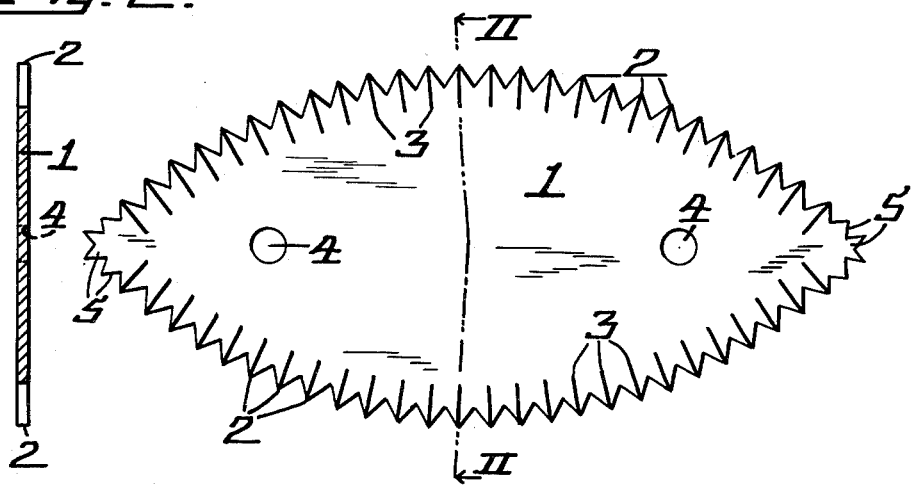
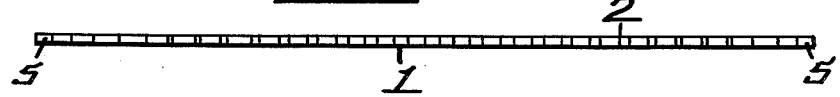
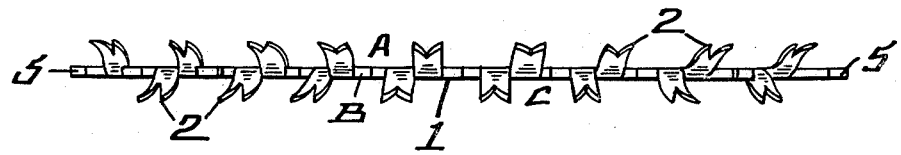
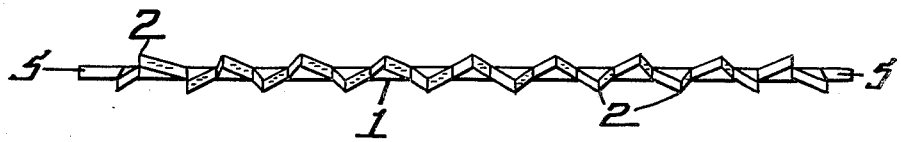

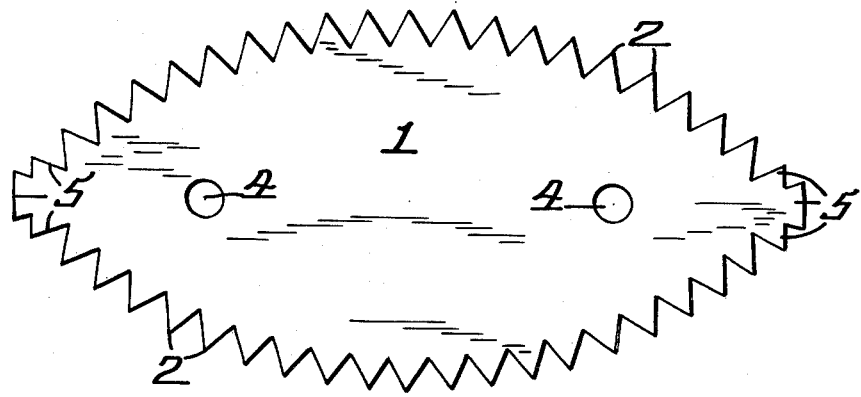
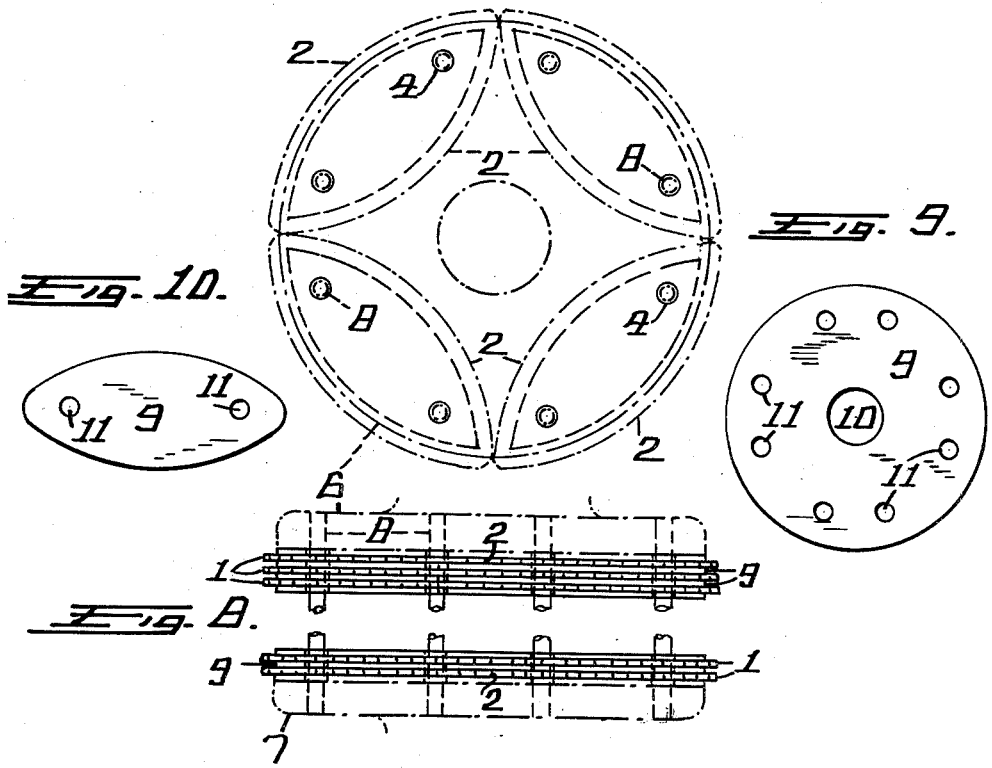

United States Patent Office
2,975,504
Patented Mar. 21, 1961

2,975,504

RASPING APPLIANCES AND CUTTERS

Frank Holdsworth Bentham, The Ranch House,
Clara Drive, Calverley, England

Filed July 11, 1958, Ser. No. 747,872

1 Claim. (Cl. 29—78)

The invention relates to rasping appliances or cutters intended for any suitable purpose, such as for use in stripping worn rubber treads from vehicle tires or for dealing with timber and other materials.

Certain types of rasping appliances comprise a centrally bored rotatable cutter block between whose cheeks there are clamped a plurality of detachable rasping cutters and spacers or distance pieces, each cutter being bowed or of arcuate shape to provide a single convex edge furnished with teeth arranged to project from the periphery of the block. These cutters are adapted to be mounted upon transverse or paraxial studs within the cutter block by the provision of suitably spaced apertures formed in the said cutters.

When teeth of the cutters become useless owing to wear brought about by rotation of the appliances in engagement with tires or other members, it is the practice to dismantle the appliance, remove and discard the cutters and replace them with fresh ones.

The chief object of the present invention is to provide a new type of rasping cutter for use with rasping appliances of the kind aforesaid, wherein two convex cutting edges are provided upon the cutter so that when the teeth or points of one convex edge become useless owing to wear the cutter may be detached from the cutter block, turned or rotated through an angle of 180° and replaced in the said block to expose or bring into action the other convex edge, thereby enabling the improved cutter to have at least twice the useful life of orthodox cutters.

Another object of the invention is to form teeth upon elliptical rasping cutters in such a manner that a greater number of teeth or points per unit distance of area are created than has hitherto been possible with teeth of conventional shape.

According to the invention the new or improved rasping cutter for use in a rotary cutter block comprises an elliptical blank furnished with teeth or points upon its periphery the major convexities of which periphery correspond to the curvature of the perimeter of the said block, and means in the cutter for locating the same within the block, whereby when the teeth on one convex edge become worn the cutter may be detached from the block, turned through an angle of 180°, and replaced in the block to expose the opposite toothed edge.

The teeth or points may be of any suitable predetermined shape and size. One very effective form of teeth or points consists of substantially equidistantly spaced points or serrations whose rake or angle may be identical about each side of the centre of each tooth to provide a plurality of inverted V-shaped teeth alternating with V-shaped spaces. Each tooth is subsequently cut or split from its apex to a base line preferably located some distance below the normal base line of the teeth to divide each tooth and produce a series of M-shaped teeth on the periphery of the blank.

The M-shaped teeth may be eventually set in any desired manner.

In order that the invention may be fully and clearly comprehended the same will now be described with reference to the accompanying drawings, in which:

Figure 1 is an elevation of a rasping cutter constructed according to one example of the invention.

Figure 2 is a cross-section of Figure 1 on the line II—II of Figure 1.

Figure 3 is a plan of Figure 1.

Figure 4 is a similar view to Figure 3 following the setting of the teeth according to one method.

Figure 5 is a similar view to Figure 4 of a cutter constructed according to the invention, furnished with another form of teeth.

Figure 6 is an elevation of a cutter of the kind shown in Figure 5, prior to setting of the teeth.

Figure 7 is a diagrammatic elevation—drawn to a smaller scale—illustrating one method of mounting and securing the improved rasping cutters in a cutter block or holder for use when removing treads from vehicle tires or for other suitable purposes.

Figure 8 is a plan of Figure 7.

Figures 9 and 10 are elevations of two different types of spacers or distance pieces which may be used when assembling the aforesaid cutters in a cutter block.

Similar reference numerals refer to similar parts throughout the several views.

The improved rasping cutter comprises a substantially elliptical metal blank 1 whose periphery is furnished with teeth or points 2. The rake or angle of the teeth is identical about each side of the centre of each tooth in the examples illustrated in Figures 1 to 6 of the drawings to provide a plurality of V-shaped teeth alternating with V-shaped spaces.

In the example of the invention shown in Figures 1 to 4 each tooth 2 is subsequently cut or split at 3 from its apex to a base line located below the normal base line of the teeth. This splitting action produces a series of M-shaped teeth on the periphery of the blank 1.

Two apertures 4 are formed in spaced relationship in the blank—on the major axis thereof, coacting with a cutter block or holder in a manner to be subsequently described.

In the cutter shown in Figure 5 the splitting of the teeth in the manner described with reference to Figures 1 to 4 is omitted.

Rasping cutters constructed according to the preceding description may be stored in a minimum of space and their teeth may be subsequently set according to the requirements of a user.

For example (see Figure 4) one tooth may remain perpendicular and each adjacent tooth bent to right or left, and so on throughout the series of teeth with the exception of the end teeth 5 which are too small to trouble about. Such a setting imparts to the cutter three rows of teeth A, B, C, when viewed endwise, each tooth having a leading edge at an angle of approximately 90° to the base line.

If desired, however, the teeth may be set to produce four or more rows of teeth.

During the setting operation the teeth are bent so as to lie almost perpendicular and in parallel relationship.

In the example of the cutter shown at Figures 5 and 6 the teeth are set alternately to left and right and the leading edge of each tooth is at an angle of about 60° to the base line, although of course it will readily be understood that any other angle may be arranged for by varying the rake of the teeth or points. Similarly, the teeth may be set in any other desired manner, for instance, two to the left and two to the right, and so on.

Cutters constructed according to the invention are intended for use in a rotatable cutter block or holder of any suitable or well known kind, the cutters being designed according to the block with which they are intended to cooperate. In other words, the convexities of the peripheries of the cutters correspond to the curvature of the perimeter of the coacting cutter block with the teeth or points arranged to project a predetermined distance from the block.

On referring to Figures 7 and 8 of the drawings it will be observed that the cutter block comprises a pair of centrally bored cheeks 6 and 7 one of which is furnished with studs 8. Four cutters constructed according to the invention are positioned upon the studs 8 by engaging the apertures 4 of each cutter with the corresponding studs, whereby the teeth 2 on one convexity or side of the cutters project beyond the periphery of the cheeks 6 and 7. A spacer or distance piece or pieces is or are then positioned upon the studs. These spacers may be composed of circular discs of material 9 as shown in Figure 9, provided with a central hole 10 and a plurality of apertures 11 corresponding in number and arrangement with the studs 8 of the block. Alternatively, the spacers may consist of elliptical discs 9 of somewhat similar size to the cutters, furnished with apertures 11. Or any other suitable kind of spacer may be employed.

When the spacers have been positioned upon the studs, another set of four cutters is placed upon the studs, followed by another spacer or spacers, the assembly of cutters and spacers being continued until sufficient have been ganged together to provide a rasping appliance of desired width, whereupon the other cheek is positioned upon the studs 8 and the whole assembly bolted or otherwise secured together to clamp the cutters and spacers in position.

When the projecting teeth or points on the projecting convexities of the cutters become worn during use the assembly is dismantled, the cutters removed, turned through an angle of 180° and replaced upon the supporting studs, after which the assembly is clamped together in the manner already indicated.

It will be understood that instead of four rasping cutters forming one set for each tier or layer in the cutter block, any other suitable number of cutters may form a set.

If desired, the teeth may be tipped with tungsten-carbide or other suitable metal or alloy and may be reduced in thickness towards their points by grinding. Furthermore, instead of utilising separate spacers when assembling the rasping cutters projections may be formed upon the blanks by welding or stamping, or otherwise.

I claim:

A rotary cutter block mounting adapted to be mounted on a driving shaft in combination with a plurality of elliptical rasping cutters having teeth on opposite faces of said cutters said mounting comprising a pair of circular cheeks which are each formed with axial bores for mounting on said driving shaft, with a plurality of paraxial studs in symmetrical array fixed to one of said checks adapted to fit through and thereby secure a plurality of sets of elliptical rasping cutters with cutting teeth of neighboring cutters projecting continuously beyond the perimeter of said pair of cheeks while being clamped between said one cheek and said other cheek, each of said cutters having apertures therein for mounting upon said studs and to be clamped between said cheeks an apertured spacer between each of said cutters and a cheek to adjust the continuous perimeter of cutting teeth from neighboring cutters, said other cheek provided with apertures for said studs on said first cheek to bring said apertured cutters with apertured spacer into clamping engagement between said cheeks, the major toothed convexities of said cutters corresponding in convexity to that of the cheeks from which cheeks the teeth project, the aforesaid apertures in the cutters being disposed symmetrically to permit inversion of the latter with the so-exposed inverted cutter edge brought into the same continuous perimeter of teeth as before inversion.

References Cited in the file of this patent

UNITED STATES PATENTS

| | | |
|---|---|---|
| 7,200 | Ustick | Aug. 11, 1832 |
| 1,347,298 | Smith et al. | July 20, 1920 |
| 1,392,050 | Dragon | Sept. 27, 1921 |
| 2,365,301 | Shortell | Dec. 19, 1944 |
| 2,703,446 | Jensen | Mar. 8, 1955 |

FOREIGN PATENTS

| | | |
|---|---|---|
| 447,379 | Germany | July 26, 1927 |
| 541,742 | Germany | Jan. 14, 1932 |